(12) United States Patent
Bischoff et al.

(10) Patent No.: US 7,758,993 B2
(45) Date of Patent: Jul. 20, 2010

(54) TUBULAR SOLID OXIDE FUEL CELL CURRENT COLLECTOR

(75) Inventors: Brian L. Bischoff, Knoxville, TN (US); Theodore G. Sutton, Kingston, TN (US); Timothy R. Armstrong, Clinton, TN (US)

(73) Assignee: Worldwide Energy, Inc. of Delaware, Oak Ridge, TN (US)

( * ) Notice: Subject to any disclaimer, the term of this patent is extended or adjusted under 35 U.S.C. 154(b) by 786 days.

(21) Appl. No.: 11/171,655

(22) Filed: Jun. 30, 2005

(65) Prior Publication Data

US 2007/0003818 A1    Jan. 4, 2007

(51) Int. Cl.
*H01M 4/00* (2006.01)
*C25B 11/00* (2006.01)

(52) U.S. Cl. .......................................... 429/40; 204/280
(58) Field of Classification Search ............... 429/40; 204/280
See application file for complete search history.

(56) References Cited

U.S. PATENT DOCUMENTS

2004/0028990 A1 *   2/2004   Lewin et al. ................... 429/40

FOREIGN PATENT DOCUMENTS

| JP | 11 111313 A | 4/1999 |
|---|---|---|
| JP | 11111313 A * | 4/1999 |
| JP | 2004055368 A | 2/2004 |
| JP | 2004 319152 A | 11/2004 |
| WO | WO 9917390 * | 4/1999 |
| WO | WO 99/45607 | 9/1999 |
| WO | 01/89011 A2 | 11/2001 |
| WO | WO 01/91218 | 11/2001 |
| WO | WO 02/31901 | 4/2002 |
| WO | 03/103079 A2 | 12/2003 |

OTHER PUBLICATIONS

European Patent Office, "International Search Report and Written Opinion," Oct. 30, 2006.

* cited by examiner

*Primary Examiner*—Patrick Ryan
*Assistant Examiner*—Karie O'Neill Apicella
(74) *Attorney, Agent, or Firm*—Luedeka, Neely & Graham, P.C.

(57) ABSTRACT

An internal current collector for use inside a tubular solid oxide fuel cell (TSOFC) electrode comprises a tubular coil spring disposed concentrically within a TSOFC electrode and in firm uniform tangential electrical contact with the electrode inner surface. The current collector maximizes the contact area between the current collector and the electrode. The current collector is made of a metal that is electrically conductive and able to survive under the operational conditions of the fuel cell, i.e., the cathode in air, and the anode in fuel such as hydrogen, CO, $CO_2$, $H_2O$ or $H_2S$.

19 Claims, 1 Drawing Sheet

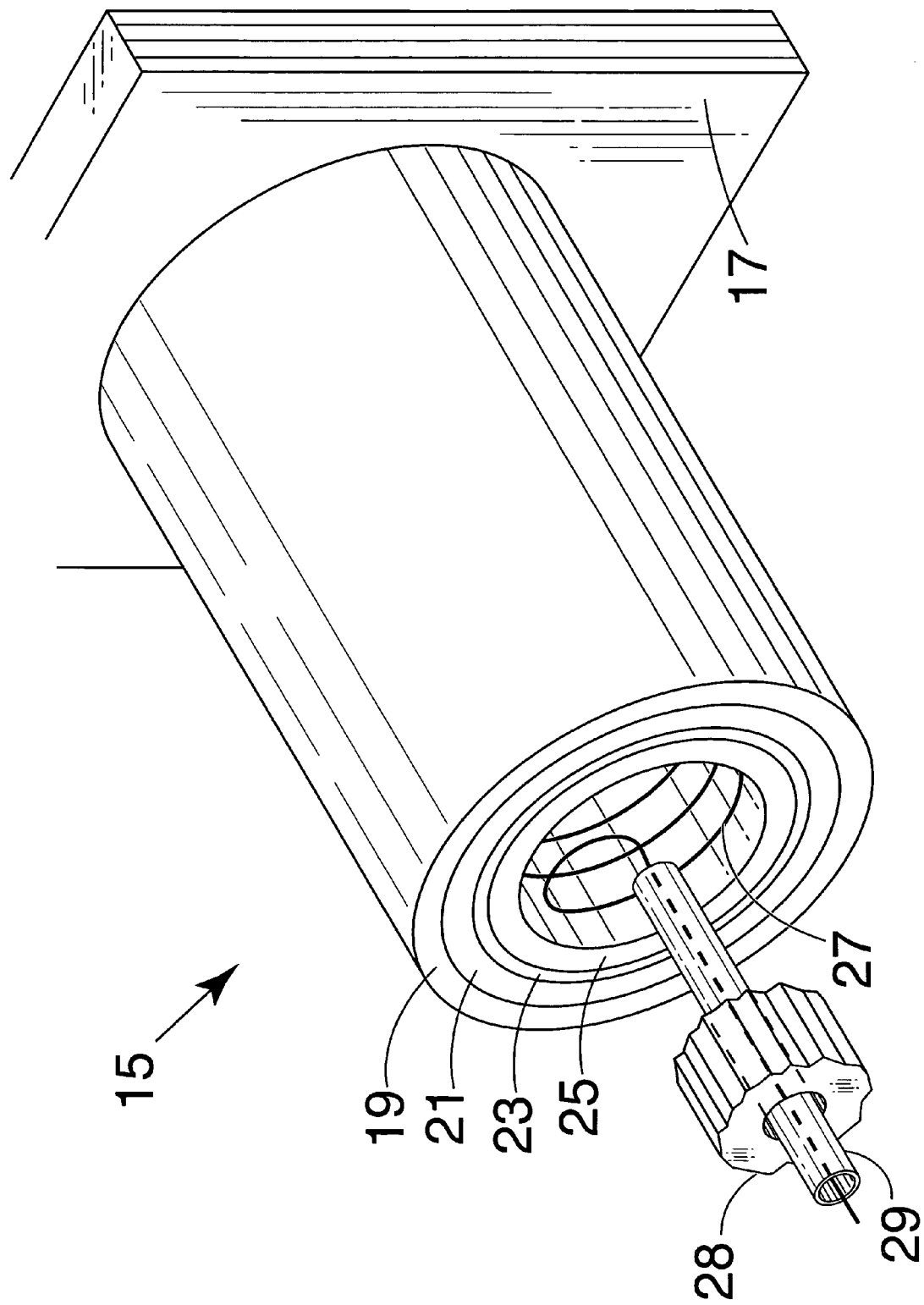

TUBULAR SOLID OXIDE FUEL CELL CURRENT COLLECTOR

STATEMENT REGARDING FEDERALLY SPONSORED RESEARCH OR DEVELOPMENT

The United States Government has rights in this invention pursuant to Contract No. DE-AC05-00OR22725 between the United States Department of Energy and UT-Battelle, LLC.

CROSS-REFERENCE TO RELATED APPLICATION

This application is related to copending utility patent application U.S. Ser. No. 11/103,333, filed Apr. 11, 2005, (ID No. 1400, S-101,996), the entire contents of which are hereby expressly incorporated herein by reference for all purposes.

BACKGROUND OF THE INVENTION

1. Field of the Invention

The invention relates to tubular solid oxide fuel cells (TSOFC), and more particularly to an internal current collector comprising a tubular coil spring disposed concentrically within a TSOFC electrode, and held in firm tangential contact with the internal wall of the electrode due to the springback force of the tubular coil spring.

2. Description of the Prior Art

Fuel cells generate power by extracting the chemical energy of natural gas or other hydrogen-containing fuel without combustion. Advantages include high efficiency and very low release of polluting gases (e.g., $NO_x$) into the atmosphere. The solid oxide fuel cell (SOFC) offers advantages of high efficiency, low materials cost, minimal maintenance, and direct utilization of various hydrocarbon fuels without external reforming. SOFCs operating with natural gas as a fuel at 1000° C. can achieve power generation efficiencies in the range of 40 to 45 percent (simple cycle). Hybrid systems combining SOFCs and gas turbines can achieve efficiencies up to 70 percent. Scientists at the United States Department of Energy's National Energy Technology Laboratory (NETL) recently developed a concept for increasing efficiencies of SOFCs to greater than 70% in a hybrid system. Their approach, called the Ultra Fuel Cell, is based on staged SOFCs where spent (but not completely combusted) fuel exiting a first SOFC stack operating at low temperature (500°-700° C.) is fed into a second SOFC stack operating at a higher temperature (>800° C.). Materials technology for high-temperature (800°-1000° C.) stacks has been developed, and could soon be commercialized for large-scale (up to 10 MW) power generation.

The ceramic materials used in high-temperature SOFCs based on current planar and tubular designs are essentially defined. Yttria-stabilized-cubic-zirconia (YSCZ) is the most widely used ceramic electrolyte membrane material because it has a high ionic conductivity and is stable in both oxidizing and reducing environments. The oxygen ionic conductivity is independent of oxygen partial pressure over a wide range of temperatures. Under these conditions, the transference number for ionic conductivity is close to unity. The use of fully stabilized YSCZ avoids problems of phase transformation associated with partially stabilized materials during cell operation. The anode material is a porous Ni—YSCZ cermet, and the cathode material is a porous $(La,Sr)MnO_3$ (LSM) ceramic. Present designs involve the use of relatively thick YSCZ membranes, which require high operating temperatures (900°-1000° C.) to achieve optimum performance.

Approaches to reduce SOFC operating temperatures all begin with reduction of the electrolyte resistance, which can be achieved by: (1) using thin film YSCZ electrolyte membranes, (2) developing nanocrystalline materials, or (3) replacing YSCZ with a higher conductivity ceramic electrolyte material. More substantial reductions in operating temperature can be achieved by combining these approaches.

Reducing the electrolyte resistance alone, however, is not sufficient. The anode and cathode materials must be re-engineered to provide the required electrochemical performance at low temperatures. Mutual compatibility of the new materials must be established, and electrochemical cell designs and stack configurations incorporating the new materials must be developed. There has been considerable published research focused on individual components (electrolytes, anode, and cathode), as well as some preliminary efforts aimed at development of low-temperature SOFCs by co-sintering.

Current collectors used in the stacks of planar solid oxide fuel cells comprise metallic screens or some type of Ni or stainless steel plate. The planar current collectors connect the cells in series, or are used at the end of the stacks to take out the generated current. The present invention does not apply to solid oxide fuel cells having a planar current collector geometry. Rather, it relates to SOFCs of tubular construction, and more particularly to an internal current collector for use in tubular SOFC electrodes.

Tubular fuel cells manufactured by Acumentrics Corporation employ a nickel wire current collector that has been spiraled around a needle former to produce a tight coil. They then feed the coil into the tubular electrode by jamming it inside to produce a good electrical contact (Ref. 1).

In another tubular fuel cell design, Acumentrics wraps a wire coil around the inside of the electrode where it electrically contacts the electrode (Ref. 2). The same reference suggests that the wire coil can be replaced by a current-collecting mesh pushed into the tubular electrode.

In an electricity-generating fuel cell from Celltech Power, a coil spring is used to urge a flat electrical contact against a flat anode surface (Ref. 3)

REFERENCES

1. "Electrode-Supported Solid State Electrochemical Cell", N. Sammes, T. Murray, M. Brown and W. Ziegler, PCT International Publication No. WO 01/91218 A2, published Nov. 29, 2001.
2. "Segmented Electrode Tubular Solid Oxide Fuel and Method of Manufacture.", C. Finnerty, G. Tompsett, B. Fenton and Y. Du, PCT International Publication No. WO 02/31901 A2, published Apr. 18, 2002.
3. "A Carbon-Oxygen Electricity-Generating Unit", T. Tao, PCT International Publication No. WO 99/45607, published Sep. 10, 1999.

BRIEF SUMMARY OF THE INVENTION

In a preferred embodiment, our invention comprises a tubular coil spring current collector disposed concentrically within a tubular electrochemical reactor electrode such that when sprung back to its normal state, the spring current collector is forced into firm uniform tangential electrical contact with the inner surface of the electrode.

BRIEF DESCRIPTION OF THE DRAWING

The single FIGURE is a representative drawing of a tubular solid oxide fuel cell (TSOFC) element showing the tubular coil spring current collector of the subject invention.

DETAILED DESCRIPTION OF THE INVENTION

In the drawing, a tubular solid oxide fuel cell (TSOFC) element having a circular cross-section is shown. The TSOFC element is supported from a metallic substrate 17 that is part of a structure supporting one or a number of TSOFC elements. The TSOFC element 15 is open at both ends. A porous metal support tube 19 is coated on the inside with a porous anode 21 such as Ni—Ni Yttria stabilized zirconia (YSZ), for example. The anode 21 is coated on the inside with a dense electrolyte 23 such as $Y_2O_3$—$ZrO_2$, for example. The dense electrolyte 23 is coated on the inside with a porous cathode 25 such as $LaMnO_3$, for example. The compositions used to make the TSOFC tube are not critical to the present invention. Moreover, the anode 21 and cathode 25 layers can be interchanged in such a structure, as is well understood in the field of the invention.

In the drawing, the internal current collector is a tubular coil spring 27 that is inserted into the tubular cathode 25 with one end of the spring 27 extending out the end of the TSOFC element 15. It is important that the spring 27 not be allowed to contact the anode 21 or any part of the fuel cell such as the housing 28 or substrate 17 that may be in electrical contact with the anode 21. One way to ensure this is to use a ceramic feedthrough tube 29 similar to those used for thermocouples. The current collecting spring 27 is fed through the bore of the ceramic tube 29 to prevent contact with other parts of the fuel cell 15. Depending on the design, the inner electrode (25) will be either the anode or the cathode. In the example shown, it is the cathode. In either configuration, current is collected by the spring 27 in firm tangential contact with the inner wall of the electrode 25 due to the springback force of the tubular coil spring 27 against the electrode.

The tubular coil spring 27 is inserted in the fuel cell 15 in a compressed state. The compressed spring is slid into the SOFC tube 15 and then released. As the spring returns to the normal or rest state, the spring's coils push outward producing a firm and uniform contact with the inside of the tube 15 in a continuous or semi-continuous manner throughout the length of the tube. The actual contact area is a function of how the spring is wound prior to insertion. The current collector 27 is made of a spring metal that is able to survive under the operational conditions of the fuel cell, i.e., the cathode in air; and the anode in fuel such as hydrogen, CO, $CO_2$, $H_2O$, or $H_2S$. The spring may be a noble metal such as platinum, palladium or silver, or a conductive nickel-based alloy such as Inconel.

The current collector spring 27 produces a continuous elastic force that is directed at the wall of the cathode 25 along the length of the wire. For example, if a tube having an inner diameter of 0.4 inches and a length of 12 inches employed a helical collector with 5 coils per inch, the collector wire 27 would contact the inside of the cathode 25 along a path approximately 75 inches long. This contact area improves the transfer of current from the cathode when compared to a single attachment point or a wire mesh jammed into the tube.

In addition to its ability to collect current from the inner electrode 25 of the fuel cell 15, the tubular coil spring 27 enhances contact of the gas flowing in the SOFC element with the inner electrode surface. In a fuel cell, this has the potential to reduce the gas concentration polarization on the electrode in question. In the case where the innermost electrode is the cathode, air flows inside the tube with oxygen dissociating on the cathode and permeating through the electrolyte. The coiled spring 27 held against the inside of the cathode 25 induces eddy currents in the gas which improve gas mixing and reduce concentration polarization, where the concentration of the oxygen would be depleted at the wall of the tube.

The materials of construction for the helical current collector can be chosen from any number of metals that are electrically conductive, can be formed into a wire, will survive in the operating environment (gas and operating temperature) of the fuel cell, and will stay electrically conductive under the operating conditions. It is advantageous that the metal have a high modulus of elasticity so that after being wound into a tubular spring, it can be stretched to fit inside the tubular electrode, and then sprung back to fit tightly against the inside wall of the electrode. The current collector 27 can be made using standard spring winding techniques. It is sized so that when in its normal state, the diameter of the spring coil 27 is slightly larger than the inside diameter of the tubular element 15. When the spring coil 27 is stretched to compress it, it can be pulled through the tubular element and will spring back when released to rest tightly against the inside of the tubular element. The diameter of the wire 27 used should be selected based on current density and making sure that the helical collector 27 does not impede the flow of gas through the tubular element. The pitch can be selected to get the desired amount of contact length of the wire against the inside surface of the tubular element.

It is known that TSOFC elements can be used as reversible fuel cells, that is, used either as fuel cells for generating electricity or in their reverse state for hydrogen production.

It is also known that TSOFC elements such as described herein can be used as solid oxide electrolyzers.

The invention claimed is:

1. An article comprising an electrochemical reactor electrode having a tubular inner surface comprising a material selected from the group consisting of a ceramic, a cermet, and a combination thereof;
    a current collector consisting essentially of a coil spring having a length and disposed concentrically within said electrochemical reactor electrode and in tangential electrical and direct physical contact with said tubular inner surface for substantially the length of the tubular coil spring current collector; and
    a ceramic feedthrough tube having a bore, wherein an end of the coil spring extends out an end of the electrochemical reactor electrode through the bore of the ceramic feedthrough tube.

2. The article of claim 1 wherein said electrochemical reactor electrode is a tubular solid oxide fuel cell electrode.

3. The article of claim 2 wherein said solid oxide fuel cell electrode is an anode in fuel.

4. The article of claim 2 wherein said solid oxide fuel cell electrode is a cathode in air.

5. The article of claim 1 wherein said electrochemical reactor electrode is a tubular solid oxide electrode in a reversible fuel cell.

6. The article of claim 1 wherein the tubular coil spring current collector is in firm and uniform contact with said tubular inner surface in a continuous manner for substantially the length of the tubular coil spring current collector.

7. The article of claim 1 wherein the tubular coil spring current collector is in firm and uniform contact with said tubular inner surface in a semi-continuous manner for substantially the length of the tubular coil spring current collector.

8. A finished element for a fuel cell comprising:
an electrochemical reactor electrode having a tubular inner surface;
a current collector consisting essentially of a coil spring having a length and having an outer diametric surface, the tubular coil spring being disposed concentrically within said electrochemical reactor electrode, wherein the outer diametric surface of the tubular coil spring current collector is in tangential electrical and direct physical contact with said tubular inner surface for a substantial portion of the length of the tubular coil spring current collector; and
a ceramic feedthrough tube having a bore, wherein an end of the coil spring extends out an end of the electrochemical reactor electrode through the bore of the ceramic feedthrough tube.

9. The finished element of claim 8 wherein said electrochemical reactor electrode is a tubular solid oxide fuel cell electrode.

10. The finished element of claim 9 wherein said solid oxide fuel cell electrode is an anode in fuel.

11. The finished element of claim 9 wherein said solid oxide fuel cell electrode is a cathode in air.

12. The finished element of claim 8 wherein said electrochemical reactor electrode is a tubular solid oxide electrode in a reversible fuel cell.

13. An article comprising an electrochemical reactor electrode having a tubular inner surface comprising a material selected from the group consisting of a ceramic, a cermet, and a combination thereof and having a length;
a current collector consisting essentially of a coil spring disposed concentrically within said electrochemical reactor electrode and in tangential electrical and direct physical contact with said tubular inner surface for substantially the entire length of the tubular inner surface; and
a ceramic feedthrough tube having a bore, wherein an end of the coil spring extends out an end of the electrochemical reactor electrode through the bore of the ceramic feedthrough tube.

14. The article of claim 13 wherein said electrochemical reactor electrode is a tubular solid oxide fuel cell electrode.

15. The article of claim 14 wherein said solid oxide fuel cell electrode is an anode in fuel.

16. The article of claim 14 wherein said solid oxide fuel cell electrode is a cathode in air.

17. The article of claim 13 wherein said electrochemical reactor electrode is a tubular solid oxide electrode in a reversible fuel cell.

18. The article of claim 13 wherein the tubular coil spring current collector is in firm and uniform contact with said tubular inner surface in a continuous manner for substantially the length of the tubular coil spring current collector.

19. The article of claim 13 wherein the tubular coil spring current collector is in firm and uniform contact with said tubular inner surface in a semi-continuous manner for substantially the length of the tubular coil spring current collector.

* * * * *